(12) United States Patent
Best et al.

(10) Patent No.: US 7,218,637 B1
(45) Date of Patent: May 15, 2007

(54) SYSTEM FOR SWITCHING DATA USING DYNAMIC SCHEDULING

(75) Inventors: Robert E. Best, Richardson, TX (US); Ramaswamy Chandrasekaran, Plano, TX (US); John R. Rudin, III, Dallas, TX (US); Rose Q. Hu, Plano, TX (US); Jeff L. Watson, Dallas, TX (US); Lakshman S. Tamil, Plano, TX (US); Alessandro Fabbri, Richardson, TX (US)

(73) Assignee: Yotta Networks, LLC, Greenbrae, CA (US)

( * ) Notice: Subject to any disclaimer, the term of this patent is extended or adjusted under 35 U.S.C. 154(b) by 1022 days.

(21) Appl. No.: 10/114,928

(22) Filed: Apr. 3, 2002

Related U.S. Application Data

(60) Provisional application No. 60/306,954, filed on Jul. 20, 2001.

(51) Int. Cl.
*H04L 12/28* (2006.01)

(52) U.S. Cl. .................................................. 370/395.4

(58) Field of Classification Search ..................... None
See application file for complete search history.

(56) References Cited

U.S. PATENT DOCUMENTS

| | | | |
|---|---|---|---|
| 5,416,769 A | 5/1995 | Karol | 370/60 |
| 5,469,284 A | 11/1995 | Haas | 359/139 |
| 5,486,943 A | 1/1996 | Sasayama et al. | 359/123 |
| 5,734,486 A | 3/1998 | Guillemot et al. | 359/139 |
| 5,737,106 A | 4/1998 | Sansonetti et al. | 359/140 |
| 6,160,812 A * | 12/2000 | Bauman et al. | 370/416 |
| 6,304,552 B1 | 10/2001 | Chapman et al. | |
| 6,345,040 B1 | 2/2002 | Stephens et al. | |
| 6,477,169 B1 * | 11/2002 | Angle et al. | 370/395.42 |
| 6,658,579 B1 * | 12/2003 | Bell et al. | 713/400 |
| 6,665,495 B1 | 12/2003 | Miles et al. | |
| 6,747,971 B1 * | 6/2004 | Hughes et al. | 370/387 |
| 7,023,840 B2 * | 4/2006 | Golla et al. | 370/360 |
| 7,023,841 B2 * | 4/2006 | Dell et al. | 370/388 |
| 2002/0029238 A1 | 3/2002 | Okuhata | |
| 2003/0067653 A1 | 4/2003 | Aicklen et al. | |
| 2005/0276263 A1 | 12/2005 | Suetsugu et al. | |

OTHER PUBLICATIONS

McKeown et al, Designing an Implementing a Fast Crossbar Scheduler, IEEE, pp. 20-28, 1999.*

(Continued)

*Primary Examiner*—Frank Duong
(74) *Attorney, Agent, or Firm*—Sprinkle IP Law Group

(57) ABSTRACT

An architecture and related systems for improving the performance of non-blocking data switching systems. In one embodiment, a switching system includes an optical switching core coupled to a plurality of edge units, each of which has a set of ingress ports and a set of egress ports. The switching system also contains a scheduler that maintains two non-blocking data transfer schedules, only one of which is active at a time. Data is transferred through the switching system according to the active schedule. The scheduler monitors the sufficiency of data transferred according to the active schedule and, if the currently active schedule is insufficient, the scheduler recomputes the alternate schedule based on demand data received from the edges/ports and activates the alternate schedule. A timing mechanism is employed to ensure that the changeover to the alternate schedule is essentially simultaneous among the components of the system.

37 Claims, 11 Drawing Sheets

OTHER PUBLICATIONS

Wu et al, Simulation-based test algorithm generation and port scheduling for multi-port memories, AMC Press, Proceedings of the 38th conference on Design automation, pp. 301-306, Jun. 2001.

Mattson et al, Communication Scheduling, AMC Press, ACM SIGARCH Computer Architecture News, ACM SIGOPS Operating Systems Review, Proceedings of the ninth international conference on Architectural support for programming languages and operating systems ASPLOS-IX, vol. 28, 34 issue 5, 5, pp. 82-92, Nov. 2000.

Soeren Lykke Danielsen, et al., "*WDM Packet Switch Architectures and Analysis of the Influence of Tuneable Wavelength Converters on the Performance*".

Soeren L. Danielsen, et al., IEEE Photonics Technology Letters, vol. 10, No. 6, Jun. 1998 "*Optical Packet Switched Network Layer Without Optical Buffers*".

John M. Senior, et al., SPIE—The International Society of Optical Engineering, *All-Optical Networking: Architecture, Control and Management Issues* dated Nov. 3-5, 1998, vol. 3531, pp. 455-464.

M.C. Chia, et al., Part of SPIE Conference on All-Optical Networking: Architecture, Control and Management Issues, Nov. 1998, "*Performance of Feedback and Feedforward Arrayed—Waveguide Gratings-Based Optical Packet Switches with WDM Inputs/Outputs*".

G. Depovere, et al., Philips Research Laboratories, "*A Flexible Cross-Connect Network Using Multiple Object Carriers*," Date Unknown, All Pages.

John M. Senior, et al., SPIE—The International Society for Optical Engineering, "*All-Optical Networking 1999: Architecture, Control, and Management Issues* " vol. 3843, pp. 111-119, dated Sep. 19-21, 1999.

Jonathan S. Turner, Journal of High Speed Networks 8 (1999) 3-16 IOS Press, "*Terabit Burst Switching*", pp. 3-16.

Ken-ichi Sato, IEEE Journal on Selected Areas in Communications, vol. 12, No. 1, Jan. 1994 "*Network Performance and Integrity Enhancement with Optical Path Layer Technologies*", pp. 159-170.

F. Callegati, et al., Optical Fiber Technology 4, 1998 "*Architecture and Performance of a Broadcast and Select Photonic Switch★*", pp. 266-284.

\* cited by examiner

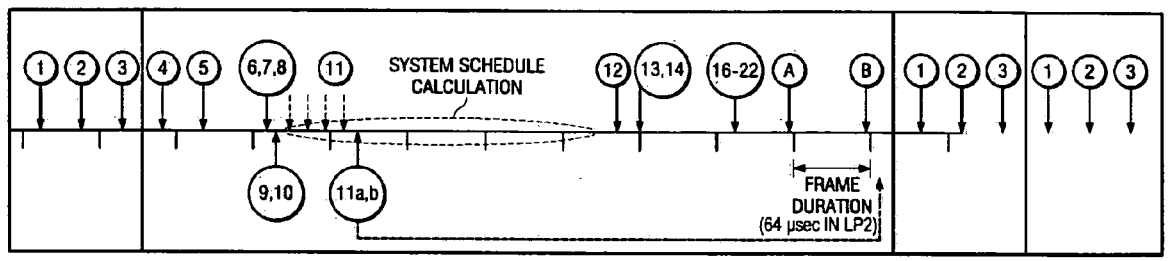

- TICK MARKS CORRESPOND TO FRAME (SCHEDULE CYCLE) BOUNDARIES IN THE CORE
- 1,2,3 SUFFICIENCY REPORTS AND RESULTING NO CHANGE ACK ON RELATIVELY SHORT CYCLE
- 4,5 SUFFICIENCY REPORTS SENT FROM PORTS TO EDGE, AGGREGATED AND SENT TO CORE
- 6,7,8 DEMAND REQUEST RECEIVED AND FORWARDED WITHIN EDGE
- 9,10 DEMAND REPORTS SENT TO EDGE JIT SCHEDULER
- 11 FILTERED, AGGREGATED EdgeDRs forwarded TO CORE JITs
- 11a,b HEADS UP MESSAGE
  - INDICATES WHEN SWITCH TO NEW SCHEDULE WILL OCCUR
  - INDICATES CONNECTIVITY BUT NOT SCHEDULE
- 12 SCHEDULES DELIVERED TO EDGE
- 13,14 PORT AND TWDM SCHEDULES DELIVERED
- 16-22 SEQUENCE OF CONFIRMATIONS OF SCHEDULE DELIVERY AND FINALLY THE SYSTEM READY MESSAGE
- A PORT BEGINS USING NEW SCHEDULE TO FEED CONTAINERS TO EDGE BUFFER
  - SCHEDULE ACTUALLY STARTS IN ADVANCE OF FRAME BOUNDARY SUCH THAT FIRST SMALL BUFFER (1 μSEC FOR POS TO FILL BUFFER ON POS FPGA WITH 320 BYTES OF PAYLOAD) IS FULL AND READY TO TRANSFER TO EDGE FRAME BUFFER ON THE TWDM FPGA AT THE START OF THE NEXT FRAME
- B TWDM BEGINS FEEDING CONTAINERS FROM EDGE FRAME BUFFER TO CORE ACCORDING TO THE NEW FRAME SCHEDULE AT THE BEGINNING OF THE NEXT FRAME SHOWS SEQUENCE AND POSITION OF A AND B RELATIVE TO FRAME, BUT NOT INTENDED TO IMPLY PROCESSING DELAYS

FIG. 12

SYSTEM FOR SWITCHING DATA USING DYNAMIC SCHEDULING

RELATED APPLICATIONS

The present application claims priority to U.S. Provisional Patent Application Ser. No. 60/306,954 entitled "System and Method for Dynamic Scheduling Implementation to Eliminate Blocking and Optimizing Performance on an All-Optical Switch" filed on Jul. 20, 2001, which is incorporated by reference as if set forth herein in its entirety.

BACKGROUND

1. Field of the Invention

The invention relates generally to the switching of data and more particularly to the transfer of data through a switching core in a non-blocking manner, wherein non-blocking schedules are dynamically computed and implemented to maintain the sufficiency of data transfers through the switching core.

2. Related Art

One of the problems that may be encountered in data switching is the blocking of data transfers because the data transfer path is already in use. In other words, while a first port is transferring data to a second port, the second port cannot receive data from any other source until control of the port is relinquished. This may significantly impact the latency of the data transfers.

This problem is typically addressed through the use of a non-blocking static data link. Conventionally, such data links operate by scheduling data transfers through the links based on statistical models of the data traffic which is expected to be transferred through the links. By planning for the expected traffic and scheduling transfers accordingly, these systems attempt to minimize blocking.

One of the disadvantages of these conventional systems is that they are based on static models of the data traffic. If the actual traffic varies from the anticipated scenario, the systems cannot adapt to the new behavior. While the statistical model upon which the scheduling of the data is based may be ideal for certain cases, it will likely be far from ideal in other cases. The performance of the systems may suffer as a result.

SUMMARY OF THE INVENTION

One or more of the problems outlined above may be solved by the various embodiments of the invention. Broadly speaking, the invention comprises an architecture and related systems for improving the performance of data switching systems. In one embodiment, the present architecture comprises an optical switching core coupled to a plurality of edge units, each of which has a set of ingress ports and a set of egress ports. The switching core has a scheduler that maintains two non-blocking data transfer schedules, only one of which is active at a time. Data is transferred from the ingress ports to the egress ports according to the active schedule. The switching core scheduler monitors data received from the edge units which indicates whether or not the currently active schedule is sufficient to meet demands of the incoming data traffic. If the currently active schedule is insufficient, the scheduler requests data from the edge units relating to the demand for bandwidth (based on the incoming data traffic). The scheduler uses this information to re-compute the inactive schedule so that it is adapted to the current demand. The scheduler stores the new schedule and, and the appropriate time, activates this schedule and simultaneously deactivates the currently active schedule. Schedulers in the edge units ensure that the changeover to the new schedule is effected in the edge units simultaneously with the switching core.

One embodiment of the invention comprises a data switching system having a switching core and a plurality of edge units. Data is received by one or more ingress edge units and is transmitted through the switching core to one or more egress edge units. Data transfers through the switching core are controlled by a scheduler which is configured to define connections between the ingress and egress edge units (a schedule) such that data is delivered from the appropriate ingress edge units to the appropriate egress edge units. The scheduler is configured to monitor the sufficiency of the active schedule and to determine whether it is necessary to compute and/or activate a new schedule in order to achieve improved performance.

In one embodiment, the scheduler comprises a scheduling system which includes a core scheduler coupled to the switching core, a plurality of edge schedulers which are coupled to the edge units, and a plurality of port schedulers which are coupled to ports in the edge units. The edge schedulers are configured to collect sufficiency data from the port schedulers and transmit this data to the core scheduler. The core scheduler examines the data and determines from this data whether the currently active schedule is sufficient. If so, this schedule continues to be used. If not, the core scheduler requests demands data from the edge schedulers. The edge schedulers collect this information from the port schedulers and transmit it back to the core scheduler, which uses the information to compute a new schedule. The new schedule is stored in one of two memories in the core scheduler (the active schedule is stored in the other memory). The core scheduler forwards the new schedule to the edge schedulers, which forward it to the port schedulers. A global timing mechanism is employed to enable the core, edge and port schedulers to simultaneously switch to the new schedule.

Numerous alternative embodiments are also possible, and are believed to be within the scope of the appended claims.

The present architecture may provide a number of advantages over conventional architectures. Primarily, since the scheduling of data transfers can be dynamically adapted to the changing character of the incoming data traffic, the system may experience lower latency and greater performance then conventional systems. Since an active schedule is maintained until a new schedule can be computed and implemented, little or no additional latency results from implementation of the new schedule. The computation of the new schedule may be based on various types of algorithms, such as statistical, optimization or heuristic algorithms, or even a combination of these different types of algorithms.

BRIEF DESCRIPTION OF THE DRAWINGS

Other objects and advantages of the invention may become apparent upon reading the following detailed description and upon reference to the accompanying drawings.

FIG. 12 is a timing diagram illustrating the sequence of messages as a function of time in one embodiment of a switching system using the present architecture.

Figure 1:
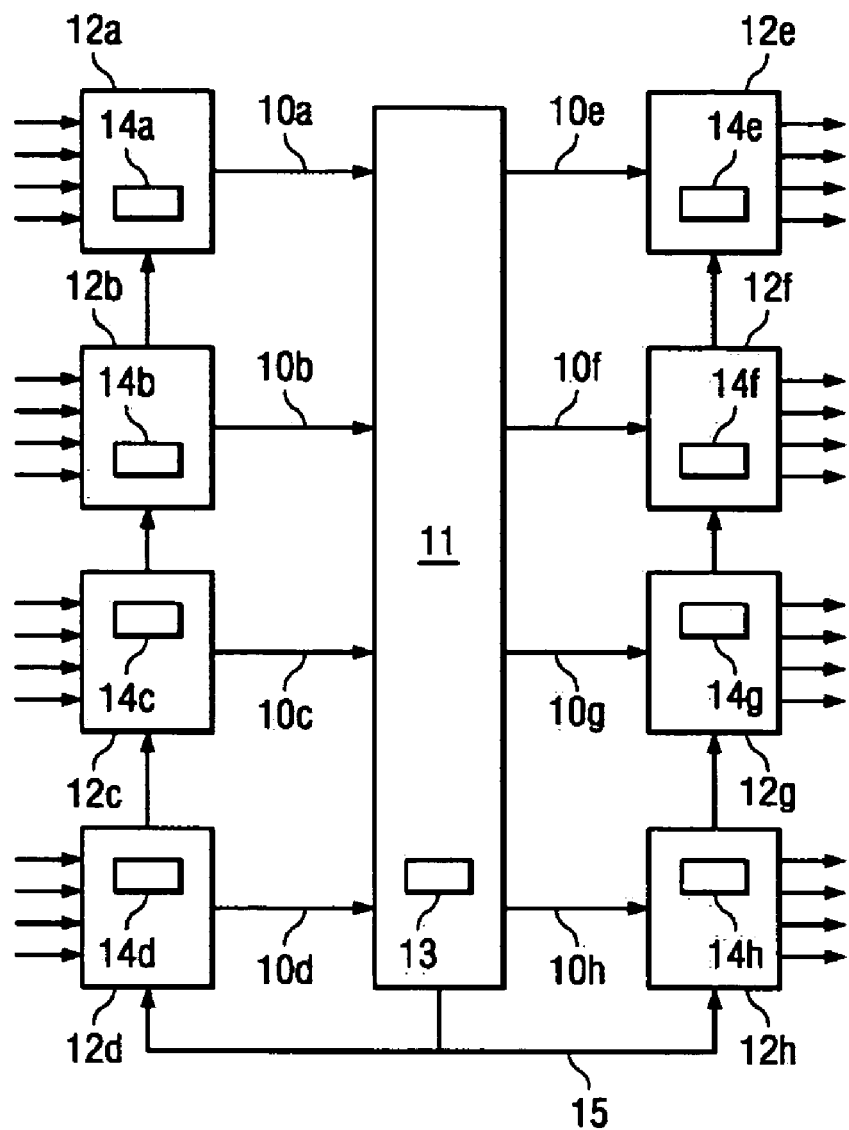
FIG. 1 is a functional block diagram illustrating the components of one embodiment of a system designed according to the present architecture.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises an architecture for a data switching system, wherein dynamic scheduling is used to maintain the sufficiency of the system's data transfer performance despite changes in the character of the incoming data traffic. In one embodiment, the present architecture comprises an optical switching core coupled to a plurality of edge units. The edge units each include a set of ingress ports and a set of egress ports. The switching core has a scheduler that maintains two non-blocking data transfer schedules, only one of which is active at any given time. Data is transferred from the ingress ports to the egress ports according to the active schedule. The switching core scheduler monitors data received from the edge units which indicates whether or not the currently active schedule is sufficient to meet demands of the incoming data traffic (e.g., whether it meets one or more criteria that indicate sufficient performance). If the currently active schedule is insufficient, the scheduler requests data from the edge units relating to the demand for bandwidth (based on the incoming data traffic). The scheduler uses this information to re-compute the inactive schedule so that it is adapted to the current demand. The scheduler stores the new schedule and, and the appropriate time, activates this schedule and simultaneously deactivates the currently active schedule. Schedulers in the edge units ensure that the changeover to the new schedule is effected in the edge units simultaneously with the switching core. (It should be noted that "simultaneously", as used herein, indicates the occurrence of two or more events within a very short period of time, rather than at a single point in time.)

The present architecture may provide a number of advantages over conventional architectures. Primarily, since the scheduling of data transfers can be dynamically adapted to the changing character of the incoming data traffic, the system may experience lower latency and greater performance then conventional systems. Since an active schedule is maintained until a new schedule can be computed and implemented, little or no additional latency results from implementation of the new schedule. The computation of the new schedule may be based on various types of algorithms, such as statistical, optimization or heuristic algorithms, or even a combination of these different types of algorithms.

Overview of the Architecture

The present architecture is directed to a multi service high capacity core router/cross connect (referred to herein as the switching system) that uses an optical core matrix and a set of high-speed edge unit. One of the advantages that may be provided by this architecture is that it can be a highly scalable network node for a future core network. To meet the blocking and delay requirements of complex router/cross connect networks, the scheduler is designed to allocate the network resources to the flows and connections with no edge blocking, and with minimal link blocking.

The traffic blocking of the switching system depends on two blocking components. The first blocking component is the blocking at the link level. In a non-blocking crossbar network, the link level blocking is eliminated because of the non-blocking nature of the matrix. In addition to the link level blocking, there is edge level blocking. The edge level blocking occurs when multiple ingress edges try to reach the same egress edge at the same time. In case of a loss system, this will cause the system blocking and the packets are lost. The present system is a delay system with packets waiting at the ingress queue. Packets will not be lost due to this contention (i.e. edge level blocking). The switching system scheduler design is configured to allocate the core optical fabric resources so that this blocking will not cause significant impact on the delay and the performance of the system. The edge blocking depends on the traffic dispersion behavior of the routing algorithm. The different routing and trunking algorithms can help to reduce the edge blocking and consequently have less delay and jitter in the switching system. (The high capacity core network design may use the very high capacity routes to reduce the number of hops). This type of network design at the core of the network may also create the opportunity for multi-link trunking operation. Scheduler design should be able to take advantage of this trunking to reduce the blocking. The preferred embodiment of the switching system is designed to deliver at least 40 Gbps switching capacity.

Referring to FIG. 1, a functional block diagram illustrating the components of a system designed according to the present architecture is shown. The switching system consists of four types of components: ports; ingress/egress edges; a switching core; and scheduling components. The components are kept synchronized during operation by a global timing mechanism. Switching core 11 is an optical switching core which is coupled to edge units 12 by optical fibers 10. Switching core 11 contains a scheduler 13 which is configured to control the scheduling of data traffic through the core. Each of edge units 12 contains one or more ports. (In order to simplify the figure, the ports are not separately depicted.) Both edge units 12 and their ports contain schedulers of their own. The edge unit schedulers are indicated by reference numeral 14. The edge unit and port schedulers are not designed to operate independently, but are designed to act in cooperation with core scheduler 13 to effectuate the scheduling of data traffic as determined by the core scheduler. The scheduling components are coupled via interconnect 15 so that they can communicate scheduling information between them.

For the purposes of this disclosure, identical items in the figures may be indicated by identical reference numerals followed by a lowercase letter, e.g., 12a, 12b, and so on. The items may be collectively referred to herein simply by the reference numeral.

It should be noted that, while FIG. 1 depicts a system having 4 edge units and 16 ports (for both ingress and egress) this figure is intended only to illustrate the present architecture, and other embodiments may have different numbers of edge units and/or ports, and may distribute scheduling functions in more or less scheduling components.

Figure 2:
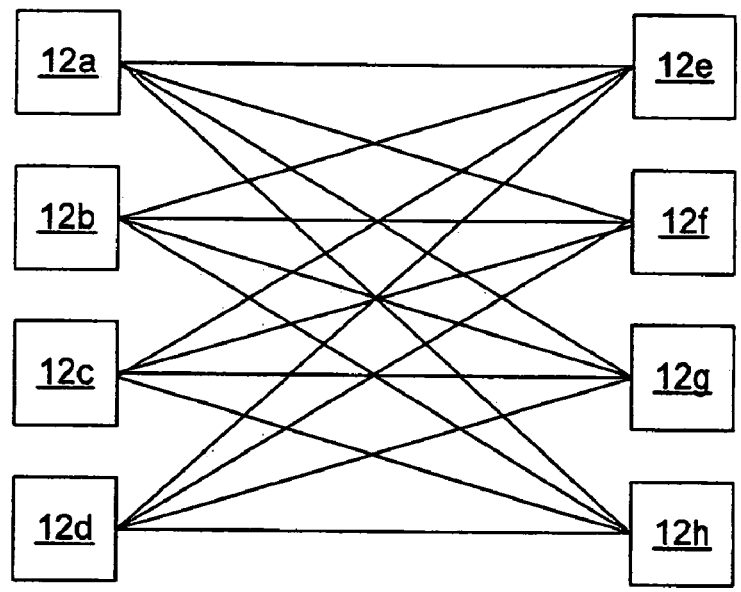
FIG. 2 is a diagram illustrating the possible interconnections between the edge units of the system depicted in FIG. 1.

Referring to FIG. 2, a diagram illustrating the possible interconnections between the edge units of the system depicted in FIG. 1 is shown. It can be seen in this figure that there are 16 possible data paths between ingress edge units 12a–d and egress edge units 12e–h. Because each of edge units 12 is coupled to switching core 11 by a single data line 10, it is evident that not all of the 16 possible data paths can be used simultaneously. When certain ones of these paths are in use, others are blocked. For example, when ingress edge unit 12a use transmitting data to egress edge unit 12e, any other ingress edge units that attempt to transmit data to this same egress edge unit will be blocked. In order to maintain a non-blocking scheme, the other ingress edge units must instead transmit data to the remaining egress edge units (i.e., 12f–h). It is the responsibility of core scheduler 13 to determine a schedule for data transfers which enables the transfers to be completed with no blocking.

Figure 3:
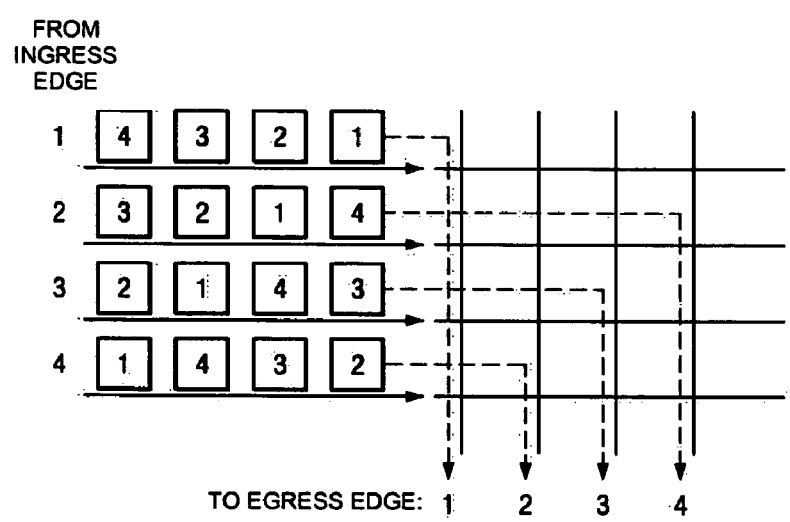
FIG. 3 is a diagram illustrating a schedule for non-blocking data transfers in a system such as the one depicted in FIG. 1.

Referring to FIG. 3, a diagram illustrating a schedule for non-blocking data transfers in a system such as the one depicted in FIG. 1 is shown. The blocks on the left side of the figure represent slots in which data can be transferred to one of the egress edges. The number inside each block indicates the destination egress edge for that slot. Each row corresponds to a schedule for one of the ingress edges. (It should be noted that, for the sake of clarity, the ingress and egress edges are numbered from 1 to 4.) The horizontal lines in the figure represent the data lines which couple the respective ingress edges to the switching core, while the vertical lines in the figure represent the data lines which couple the respective egress edges to the core.

It can be seen from FIG. 3 that the data in successive time slots at ingress edge 1 are transmitted to egress edges 1, 2, 3, and 4, in that order. The time slots corresponding to ingress edge 2 are directed to egress edges 4, 1, 2 and 3. If the contemporaneous time slots for each of the ingress edges are examined, it can be seen that, at any given time, each egress edge is only scheduled to receive data from one ingress edge. For example, in the first time slot, ingress edges 1, 2, 3 and 4 are scheduled to transmit data to egress edges 1, 4, 3, and 2, respectively. Thus, at any given time, each of the data lines is only being used by a single ingress/egress edge pair, and none of the data transfers will be blocked.

System Detail

The preferred embodiment is a 40 Gbps architecture consisting of 4 edges and 1 core. Each edge has 4 OC-48 ports. In the preferred embodiment, the actual physical port interface is OC-192 but for the purposes of this analysis, only the equivalent of an OC-48 capacity is activated for each port. In addition to TDM service, the preferred embodiment will support four packet-based classes of services, MPLS, DiffServ1, DiffServ2 and BestEffort.

The base model of the system architecture for the preferred embodiment is exemplified by the following characteristics.

1. OC-48 ingress port cards generating 16 virtual waves, each at a bandwidth rate of OC-3.
2. Edges are connected to the Core using a 4-lambda DWDM link with 64 virtual waves running at a rate of OC-3 each. This represents an aggregate of 10 Gbps from each edge and a combined 40 Gbps to the core for the four edges.
3. A central dynamic scheduler determining the scheduling patterns and changing as a function of the changes in input traffic characteristics. The connectivity is subject to change each microsecond and the dynamic scheduler will produce a frame size of 64 microseconds, which will remain in effect until a new schedule is defined.
4. For each edge, the base model assumes that there are 64 wave slots per scheduling cycle, with each wave slot at 1 microsecond. Each wave slot will switch a 1250 byte container.

Figure 4:
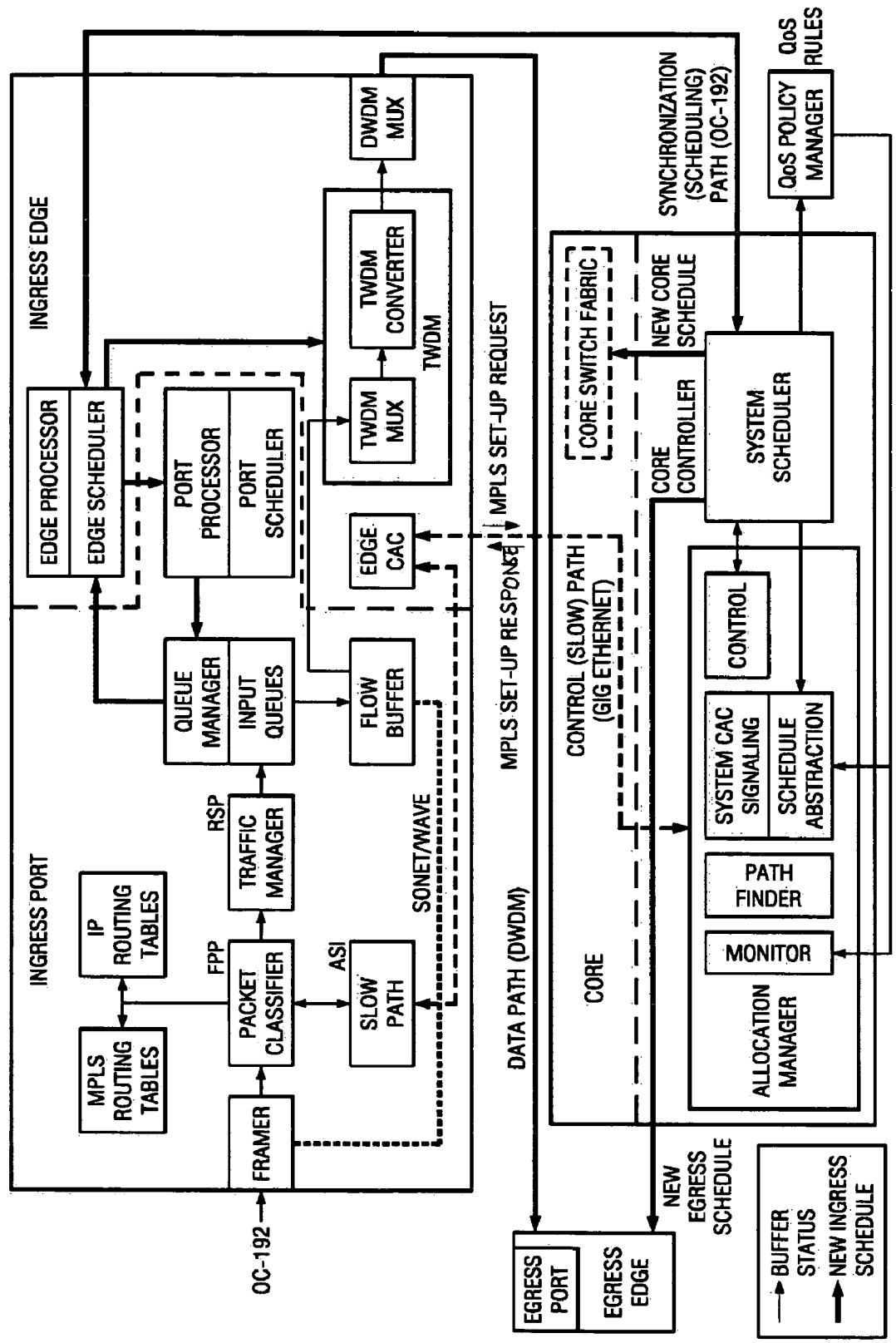
FIG. 4 is a detailed view of some of the components of one embodiment of the present scheduling process architecture.

FIG. 4 presents a more detailed view of some of the components of one embodiment of the present scheduling process architecture. This system is composed of a core and one or more edges, where each edge has one or more port cards. Only a single ingress edge and egress edge are depicted in the figure. In this embodiment, each edge and each port has both ingress and egress functionality (i.e. there are not separate ingress and egress edges). In FIG. 4, the components of the ingress port are separated from the ingress edge that hosts the port by a heavy dashed line. As indicated above, the same ingress edge hosts several ports.

The switching system will support both time division multiplexed (TDM) traffic and packet traffic (Packet Over SONET—POS). A port card that supports packet traffic will be assumed to support four different qualities of service for the preferred embodiment: MPLS (Multi-Protocol Label Switching); Differentiated Services, or DiffServ 1 (DFS-1); DiffServ 2 (DFS-2); and Best Efforts (BE). Though TDM and packet traffic will not both be supported in the same port card for the preferred embodiment, FIG. 4 demonstrates the different paths that would be taken by the different types of traffic. As pictured, TDM (SONET/WAVE) traffic will be detected at the framer and be routed directly to the flow buffers for transport through the core. There will be no delays for queuing. Packet traffic, on the other hand, will be directed to the packet classifier that will determine the path through the switching system. The packet is then placed into an appropriate input queue to wait for scheduling.

An ingress edge has 4 ports, each of which is either a TDM card or a POS card. A POS packet traverses the framer and packet classifier, then waits in the input queue for servicing. A TDM packet traverses framer first, then goes directly to the staging buffer for servicing. The dynamic scheduling algorithm provides the service order for different queues. When a packet arrives at the egress edge, it is distributed to a target port based on the appropriate dynamic schedule instance. Limited buffering is done at the egress ports to address the problem of jitter and packet fragmentation. The egress edge behaves as a dummy receiver from the core and as a transmitter to the external network devices.

The optical core creates a virtual fully-connected mesh between ports by periodically reconfiguring the core to allow exchange of data from one port (the ingress port) to another port (the egress port) as shown in FIG. 3. The packet data from all ingress ports is synchronized with the switching cycle of the space switch fabric in the core. The schedule is coordinated and enforced throughout the switching system. Incoming data is switched to the appropriate egress ports without blocking or packet loss due to contention in the core. Thus the core is responsible for two tasks: switching and scheduling.

FIG. 4 displays three paths connecting the various edges to the core. First the control path (also referred to as the 'slow path') carries control messages within the switching system to and from the core control complex. In the preferred embodiment, this is a LAN controlled by a gigabit (100 MBPS for the preferred embodiment) Ethernet switch. The data path carries the actual traffic over a DWDM optical fiber. Finally the synchronization path carries both synchronization messages and scheduling messages between the edges and the core over separate optical links. In the preferred embodiment, the scheduling messages are carried on the control path.

Figure 5:
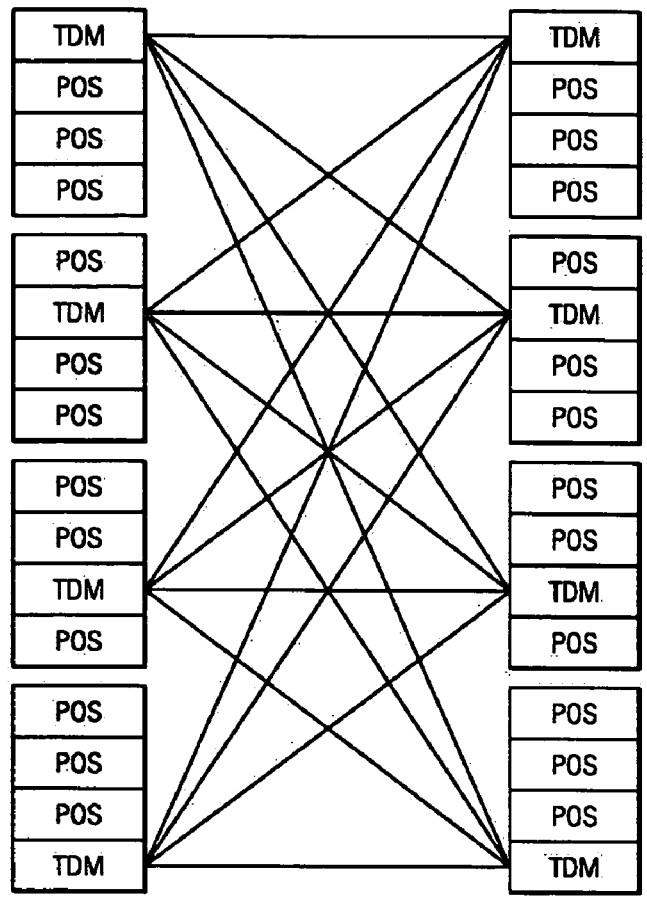
FIG. 5 is a diagram illustrating the mix of port cards that are used in one switching system according to the preferred embodiment.

FIG. 5 demonstrates the mix of cards that is used in the preferred embodiment. Each TDM interface supports four OC-12 TDM streams that can be dynamically established and removed. The figure depicts all combinations of TDM connections that may be present. Each POS port can support any mix of MPLS, DFS-1, DFS-2, and BE traffic. This traffic is self-similar, and is managed in separate input queues in the ingress ports. (For the sake of clarity, not all the combinations of connections that can be present between the POS ports are depicted.)

Figure 6:
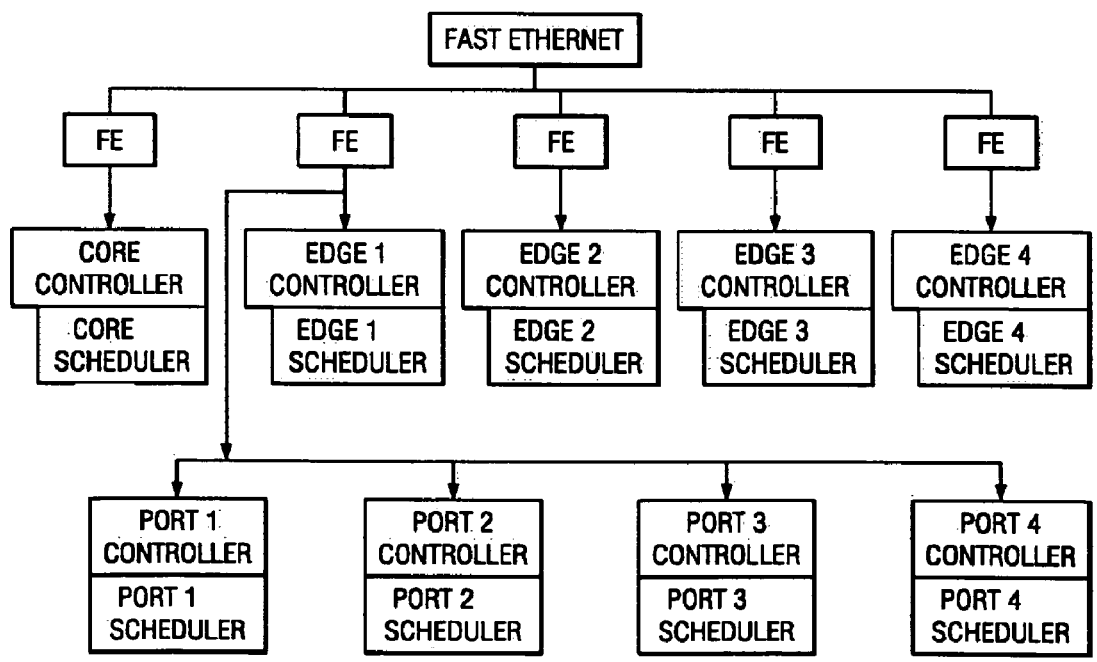
FIG. 6 is a diagram illustrating a fast ethernet interconnection between the scheduling subsystems in one embodiment.

For the preferred embodiment, control messages and scheduling messages are carried over a single Fast Ethernet path (100 Megabits per second) connecting the core, the edges and all ports. In one embodiment, this connectivity is provided in the form shown in FIG. 6. This implies that the control and scheduling messages will share the same bandwidth. There are effectively two distinct paths between the edges and the core—the data path and the messaging path.

The function of the scheduler in the preferred embodiment is distributed in three separate levels. FIG. 4 displays a "core scheduler" residing in the control cluster in the switching system core; the "edge scheduler" residing in the edge controller for each edge; and the "port scheduler" residing in each ingress port. For the preferred embodiment, the core scheduler is the entity primarily responsible for determining and distributing a non-blocking (i.e. non-edge-blocking) schedule for the entire system. Each schedule will define a series of non-blocking fiber core connections between all ingress and egress ports. This series of connections is referred to as a frame. This frame will be repeated until a new schedule is adopted. The heavy, solid lines primarily on the right side of FIG. 4 represent the links connecting the different levels of the scheduler. As will be described in detail below, these links carry a variety of scheduling messages between the various components of the scheduler. For the preferred embodiment, these connections may be better understood by referring to FIG. 6.

The preferred embodiment uses a heuristic scheduling algorithm. This approach is designed to produce a dynamic schedule as frequently as is practicable which is sensitive to the various QoS (quality of service) classes for packetized data. At the same time, this scheduler will support the establishment and operation of TDM traffic streams that have extremely stringent latency requirements. As will be described in more detail later, the ports and edges will send to the core scheduler a measure of sufficiency (referred to herein as a "sufficiency report message" of the current schedule in place. When this measure indicates that the current schedule is no longer adequate, a new schedule will be computed and distributed to the port schedulers through the intermediate edge schedulers. At the same time, the new schedule is distributed to the core fabric. After acknowledgement of receipt of the new schedules, and in sync with the periodic frame schedule, the entire system will instantaneously switch to the new schedule pattern.

The specific details of the heuristic algorithm are not essential to understanding the present invention, and will not be described in detail here. It should be noted that any appropriate algorithm can be used in the various embodiments of the invention.

Scheduler Operation

Figure 7:
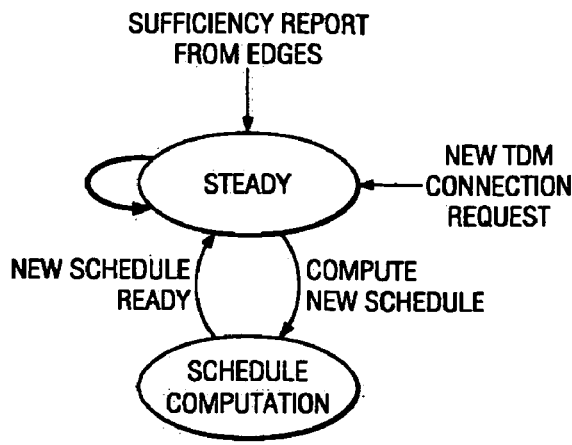
FIG. 7 is a state diagram illustrating the operation of a switching system in accordance with one embodiment of the present architecture.

The dynamic scheduler in the preferred embodiment employs the two state scheduler operation as illustrated in the state diagram of FIG. 7. In a steady state, the switching system will repeatedly run a schedule pattern. The pattern will be repeated as long as the core scheduler determines that the performance of the schedule remains sufficient. The core scheduler determines sufficiency by evaluating the data in the sufficiency reports received from the edge schedulers. When the core scheduler determines that a new schedule is needed, it triggers a transition to the scheduling computation state. Transition to the scheduling computation state can also be triggered by a TDM connection request message coming from the core control complex.

Figure 8:
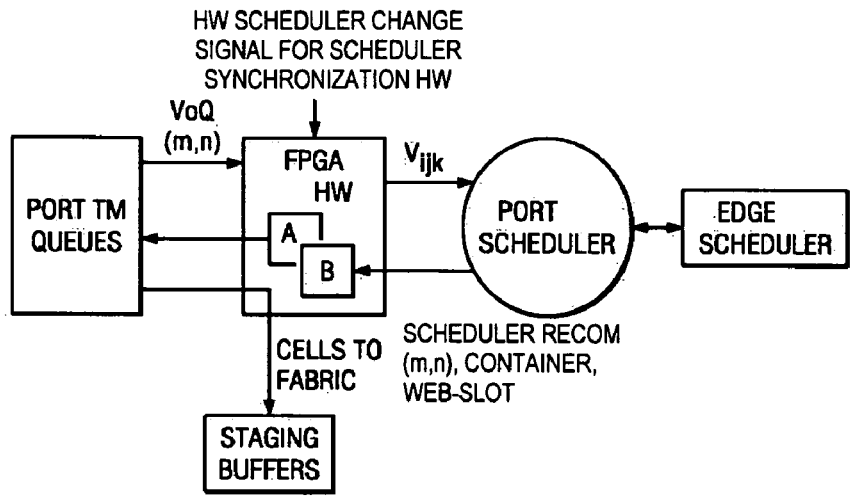
FIG. 8 is a diagram illustrating the hardware configuration of a port card in one embodiment of a switching system using the present architecture.
Figure 9:
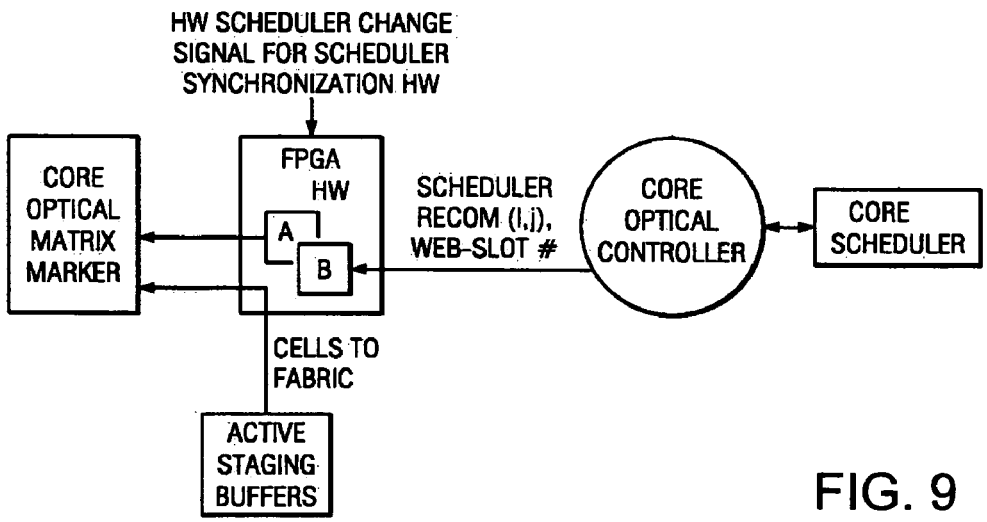
FIG. 9 is a diagram illustrating the hardware configuration of a core optical matrix card in one embodiment of a switching system using the present architecture.

The schematic implementation of this hardware is shown in FIG. 8 for the port card and FIG. 9 for the core optical matrix control card. The FIG. 8 FPGA hardware implementation has two storage areas "A" and "B" to store the scheduler recommendations. Only one of the scheduler recommendations will be active at any one time. The area storing the other recommendation is available to receive a new schedule recommendation from the port scheduler. The FPGA hardware in the port card also collects the statistics relative to queue occupation from the traffic manager and computes the $V_{ijk}$ parameters. The manner in which the computation is performed is not essential to understanding the invention and, consequently, will not be described further here.

FIG. 9 shows the schematic implementation of the optical matrix core control scheduler. It also has two storage units for schedule recommendation. At any time, only one storage unit is active and the system will use the recommendation stored in the active unit. The new schedule is transferred to the non-active unit by control plane messages.

The schedule change-over is triggered by a core scheduler synchronization signal. Special synchronization hardware synchronizes all the packet transfers from the different queues through the core optical matrix. This special synchronization hardware is triggered by a synchronization message from the core scheduler.

All the schedule recommendations are sent from the core scheduler in the form of control messages to the edge schedulers and core optical controllers. The special FPGA implementation of FIG. 8 and FIG. 9 stores these recommendations for scheduling. At the right time, the synchronization hardware will transfer control of the schedule from the one memory plane to another. This transfer immediately activates the new schedule in the whole system and ensures the system integrity.

The actual manner in which scheduler messages are interfaced to the different system hardware components may be different in other embodiments.

The staging buffers at the ingress edge unit transfer the containers from the traffic manager and store them for the next schedule cycle (the next repetition of the schedule). This mechanism prevents changing the scheduler from old to new schedule simultaneously at ingress edge unit, optical core matrix and egress edge unit. The core schedule synchronization hardware will change the Ingress edge unit to new schedule first. In the following web-slot, it will change the schedule of the optical core matrix. Finally, in the next web slot, it will change the egress port schedule.

The core scheduler is the main "brain" of the design of the preferred embodiment and has multiple functions including:

(1) Determination of the instant of computing the new schedule system;
(2) Collection of the demand reports from the edge scheduler to generate the network traffic view of the system before computing the new schedule;
(3) Computation of the new schedule;
(4) Segmentation of the global scheduler computation into edge specific schedule recommendation;
(5) Transfer of schedule recommendations to the various edge units and optical core matrix controller;
(6) Collection of the ready messages from the various scheduling units (edges and core); and
(7) Informing the synchronization hardware that schedule is now ready.

These activities are explained in more detail below. In particular, the internal functioning of the scheduler plane, the scheduler messaging and scheduler message formats are presented.

Scheduler Design

FIG. 7 indicates the two states of the scheduler. It is expected that the system will be in the 'steady state' most of the time and the internal loop on that state will be not more than a few cycle times. Once the system transitions to the scheduler computation state, the lifetime of that state may be numerous cycle times.

Switching in the preferred embodiment is based in the deployment of a dynamic scheduler. The preferred embodiment can be assumed to always have an active schedule, which consists of a list of connections that will be available to each port. As a new schedule is being prepared, the currently active schedule will remain in place. The scheduler uses the schedule to send data across the switch fabric, monitors the schedule to see if it is still adequate, and calculates a new schedule when the old one is no longer sufficient. The scheduling activities are distributed over three levels that defining the scheduling system: the core scheduler, which creates the schedule and co-ordinates the other layers; the edge scheduler (one in each edge), which co-ordinates between the core and the ports; and the port scheduler (one in each port card), to handle the individual port decisions.

In addition to scheduling duties, the edge scheduler serves as the messaging interface between the edge components and the core components. The port scheduler and the TWDM edge controller interface with the edge scheduler to exchange reports and schedules. The edge scheduler interfaces with the core scheduler to exchange the aggregated reports and edge level schedules.

Scheduler Messaging Transactions

The design of the scheduler for the preferred embodiment is characterized by the messaging transactions between the different subsystems (components). The following subsystems are involved in this communications in the preferred embodiment. The port scheduler is a scheduler software function residing on the port control processor. The edge scheduler is a scheduler software function residing in the TWDM edge controller. The core scheduler is a software function located in the control cluster. It is contemplated that this function may need a dedicated core microprocessor.

In addition to these scheduler functions, the following subsystems will be involved in the scheduling operation. The port traffic manager is where all the incoming packets are queued based on destination egress port and QoS. The core cluster controller is the control cluster in the core where all application-processing functions are performed. The core optical matrix controller is the processing function responsible for controlling the cross-point operations of core optical matrix. The core synchronization hardware is a special hardware device that will synchronize the scheduler timing operation and control the scheduler change operation.

Figure 10:
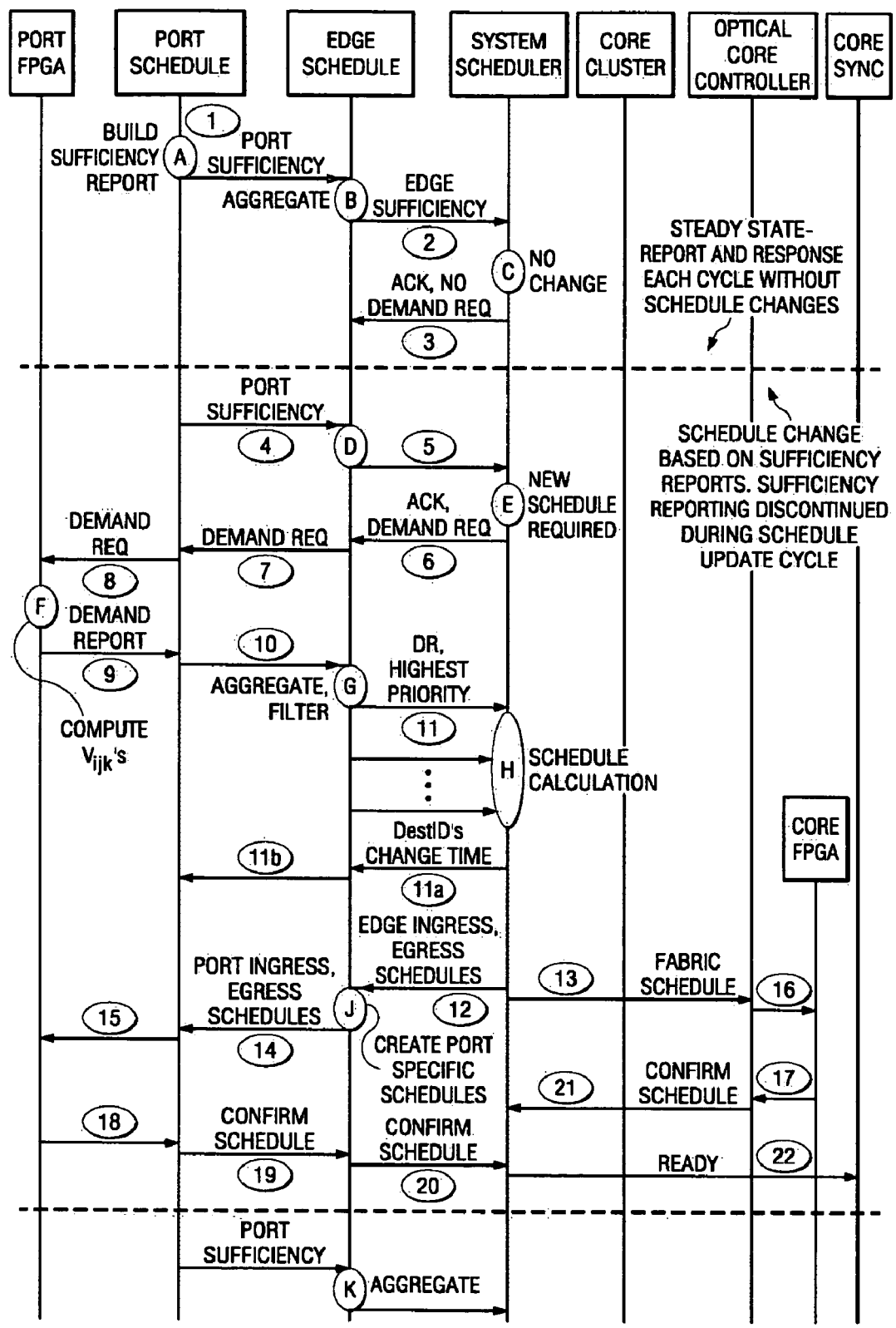
FIG. 10 is a timing diagram illustrating the messaging transactions initiated for POS traffic in one embodiment of a switching system using the present architecture.
Figure 11:
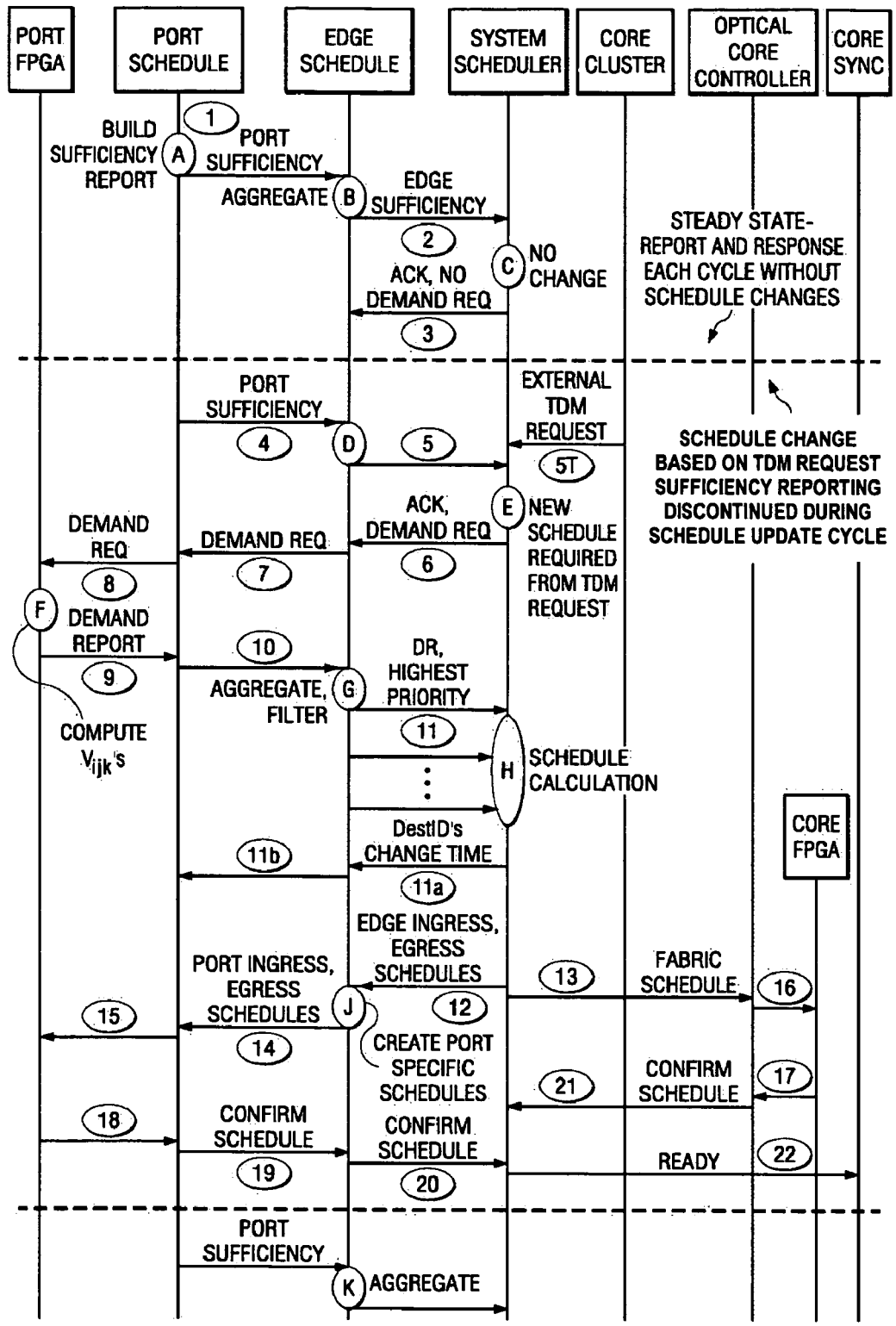
FIG. 11 is a timing diagram illustrating the messaging transactions initiated for TDM traffic in one embodiment of a switching system using the present architecture.

The messaging between these subsystems is shown in FIG. 10 for POS type traffic and FIG. 11 for TDM traffic. As was mentioned previously, during the steady state, each of the ports reports how that its traffic is being served by sending sufficiency reports to the edge scheduler (Message 1). The edge scheduler aggregates these reports and sends a sufficiency report to the core scheduler (Message 2). These reports are nominally sent once per cycle.

The core scheduler accepts the sufficiency reports of the edge scheduler and evaluates the reports. At some point, triggered by a set of sufficiency reports, the core scheduler determines that the change in schedule is required and enters into the schedule computation state. The core scheduler sends a message to each edge scheduler requesting a demand report (Message 6). The edge scheduler transfers the message to the port scheduler (Message 7). Each port scheduler sends the request to the Port FPGA Hardware to initiate the $V_{ijk}$ computations for the port (Message 8). The Port FPGA sends the $V_{ijk}$ values to the port scheduler (Message 9). Port demand reports are sent to the edge scheduler (Message—10) where they are filtered and aggregated before being sent to the core scheduler (Message 11). Message 11 will be sent in multiple bundles so that the core scheduler can start the calculations on receipt of the first message bundle from each edge. The parallelism created by this operation can reduce the schedule calculation time.

The system scheduler begins calculating a new schedule based on the demand reports. Once the system scheduler has decided what flows will be served, but prior to the actual allocation of timeslots, it sends a message to the edges to inform them that a new schedule will be put into service in the future and indicate the flows to be served. The utility of this message will be tested during the simulation analysis. This advance notice enables the ports to gracefully close off flow, which will be terminated.

The timing of the transition to the new schedule will be dictated by a synchronization-timing signal. Coordination of the prediction by the system scheduler and the mechanism issuing the signal to change to a new schedule is required and the closer the predicted and the actual transition time, the better. On completion of the scheduling computation, the core scheduler communicates the new schedule to all the edge schedulers and the core optical matrix controller (Message 12 & 13). The edge scheduler on receipt of this message transfers the port schedules to the respective port schedulers (Message 14). The Port scheduler transfers the schedule recommendation to the Port FPGA hardware and thus loads the schedule into the inactive part of the Port scheduling memory (Message 15). Similarly, the core optical matrix controller loads the schedule recommendation into the inactive part of the FPGA for schedule change (Message—16). The port FPGA and the optical matrix FPGA send back a schedule ready message to the port controller and optical matrix controller (Message 17 & 18). The schedule ready message is then send back to the core scheduler by the edge scheduler and core optical matrix controller (Messages 19, 20 & 21). The core scheduler, on receipt of the all the ready messages from all the subsystems, sends the final ready message to the core synchronization hardware module. At the appropriate instant, the core synchronization module changes the scheduler. The ports then begin using new schedule to fill the flow buffers. One frame later plus some marginal delay, the TWDM begins feeding containers from Edge frame buffer to core according to the new frame schedule.

POS Initiated Schedule Change. This section describes the sequence of messages used to maintain synchronized schedules across the switching system. The POS initiated schedule update message flow is shown in FIG. 10. The scheduling mechanism will have two states: the steady state in which a schedule is used repeatedly; and a transition state in which a new schedule is created, distributed and brought into service.

POS Initiated Scheduling Messages. Following is a list which identifies the messages transmitted in relation to POS-initiated scheduling.

(1) During the steady state, each of the ports determines and reports how well its traffic is being served by sending sufficiency reports to the edge scheduler.

(2) The edge scheduler aggregates these reports and sends a sufficiency report to the core scheduler. These reports are nominally sent once per frame.

(3) The core scheduler evaluates the sufficiency reports. In the reporting cycle shown, it was determined that a new schedule was not required and an acknowledgement of the sufficiency report is sent to the edges, but no demand report is requested.

(4) This is the same as message 1, but this is the start of a transition to a new schedule. One or more of these port sufficiency reports will trigger the system scheduler to create a new schedule.

(5) Same as message 2.

(6) The core scheduler evaluates the sufficiency reports. The core scheduler requests all of the edges to generate a demand report.

(7) The edge scheduler requests all of its ports to generate a demand report.

(8) The port scheduler requests the Traffic Manager to generate a demand report.

(9) The traffic Manager provides demand report to the port scheduler

(10) The port scheduler sends demand reports to the edge scheduler.

(11) The edge scheduler filters and aggregates the port demand reports and forwards edge demand reports to the core scheduler. The edge scheduler actually sends a series of demand reports to the core scheduler. The filtering process selects the most important containers from each port and reports on them immediately and reporting on lesser important containers in subsequent messages. This reduces the demand report message size and allows the core scheduler to start generating a new schedule.

(11a, 11b) The core scheduler notifies the edge schedulers which notify the port scheduler that a new schedule is coming, informing them of what flows will be supported, and estimating when the new schedule will take effect. This advance notice enables the ports to gracefully close flows that will be terminated.

(12) The core scheduler sends each edge scheduler its new schedule.

(13) The core scheduler sends the core schedule to the optical core controller.

(14) The edge scheduler extracts those components of the edge schedule needed by each port and sends them to the respective port scheduler.

(15) The port scheduler delivers the schedule to the Traffic Manager.

(16) The optical core controller sends the core schedule to the core FPGA.

(17, 21) the core FPGA acknowledges receipt of the new schedule to the port scheduler, which acknowledges to the system scheduler.

(18, 19, 20) The port FPGA acknowledges receipt of the new schedule to the port scheduler, which acknowledges to the edge scheduler, which acknowledges to the system scheduler.

(22) The system scheduler notifies the core synchronization system that a new schedule has been deployed and is ready to be activated.

TDM Initiated Schedule Change. The message flow for a schedule change due to a request for a new TDM flow shown in FIG. 11 is nearly identical to that described above. The core cluster receives a TDM request and determines that it can and should be supported and it notifies the system scheduler with message 5T. From that point, the message flow is the same as the POS starting at message 6.

Timing of Scheduling Messages. The sequence of messages is shown against the time-line in FIG. 12. This diagram will be refined as estimates of processing and link delays are incorporated. A fixed estimate based on knowledge of the schedule processing delays is used to predict the time that a new schedule will take effect. As described above, the core scheduler will report this delay estimate when it reports which flows are going to be serviced.

Scheduler Functional Logic

As described above, the scheduling system has three components or subsystems: The core scheduler; the edge schedulers; and the port schedulers. The functional logic of each of the scheduler subsystems is described below with reference to the flow diagrams of FIGS. 10 and 11. References to functions (e.g., "function A") relate to the functions identified in FIGS. 10 and 11 by the corresponding letter. The functions are deviated into three distinct categories (the functions are designated by capital letters which correspond to FIGS. 10 and 11):

Core scheduler functions include: function C—processing of the sufficiency report; function E—determination of the need for a new schedule; and function H—schedule computation. Edge scheduler functions include: function B/D—aggregation of sufficiency report; function G—aggregation/filtering of demand report; and function J—port ingress and egress schedule recommendations, separation and transfer. Port scheduler functions include: function A—preparation of sufficiency report for the corresponding port. These functions are described in more detail below.

Functions of the Core Scheduler

The core scheduler makes all global scheduling decisions for the switching system. It determines when a new schedule is needed, calculates the new schedule, and sends the schedule to the edge schedulers when it is finished.

During the steady state, the core scheduler receives sufficiency reports each frame, from each edge. With this data, the core scheduler determines if the current schedule is sufficient. This is a simple calculation, much quicker and easier than determining what a new schedule should be. When the core scheduler decides that a new schedule is needed, it then requests demand reports from the edges, based on the status of the queues in each port. After receiving the demand reports, the core scheduler calculates a global schedule based on the composite demand data. The new schedule is then sent to the edges for delivery to the ports, and the changeover to the new schedule is coordinated on a global basis. At the same time the new schedule is sent to the edges, it is also sent to the core fabric to facilitate the core switching requirements.

Sufficiency Decision (C & E). The core receives the sufficiency reports and determines whether the current schedule is sufficient. Each port sends the total $M_i$, of the values of the best 16 highest priority containers waiting at the port, and the total $R_i$ of the 16 containers actually sent. Note that the best schedule for the system as a whole is not necessarily the sum of the schedules represented by the various $M_i$'s. These could, and likely will, be infeasible. However, the sum over the entire system of the differences $M_i-R_i$ represents a measure of the value of the schedule. If this quantity goes over a certain threshold level, the core scheduler decides to request current demand data in preparation for computing a new schedule. Furthermore, if the quantity is consistently rising, then that indicates that the current schedule is not keeping up with the best incoming traffic, and that also triggers the demand for a new schedule. Therefore, the two equations that are checked are the following:

$$\Sigma_i(M_i-R_i) > Max_1$$

$$d/dt[\Sigma_i(M_i-R_i)] > Max_2$$

Figure 13:
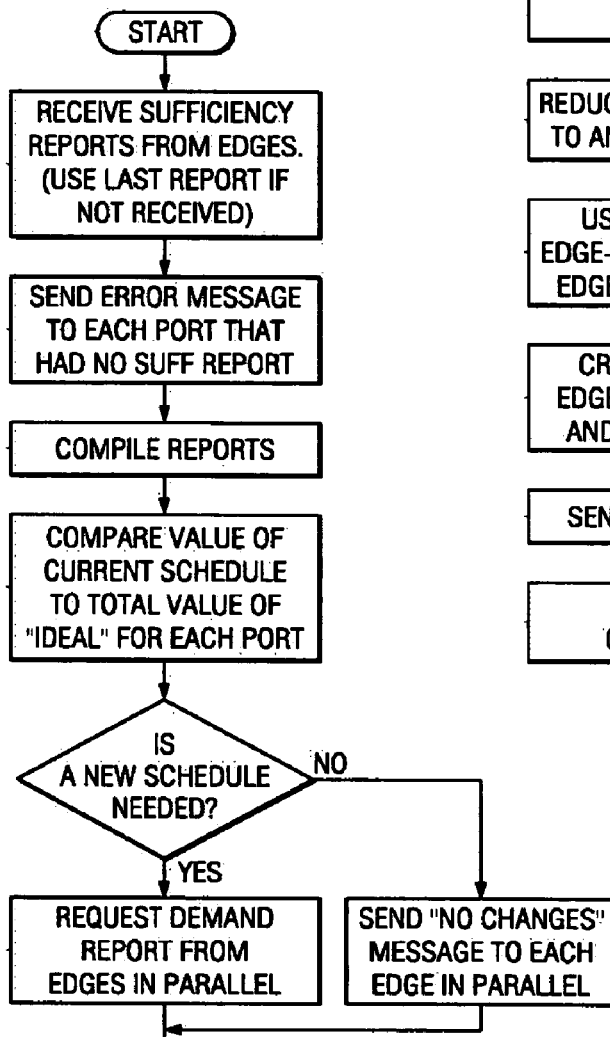
FIG. 13 is a flow diagram illustrating the process which is implemented in making a decision regarding the sufficiency of the active schedule in one embodiment of a switching system using the present architecture.

$Max_1$ and $Max_2$ values will be initially defined, but will be refined as a result of simulation tests. Note that for the second equation, the core scheduler must store the value of $\Sigma_i(M_i-R_i)$ over the course of several Cycles. The second equation is measuring whether this quantity is continuously rising. The process is shown in FIG. 13.

Figure 14:
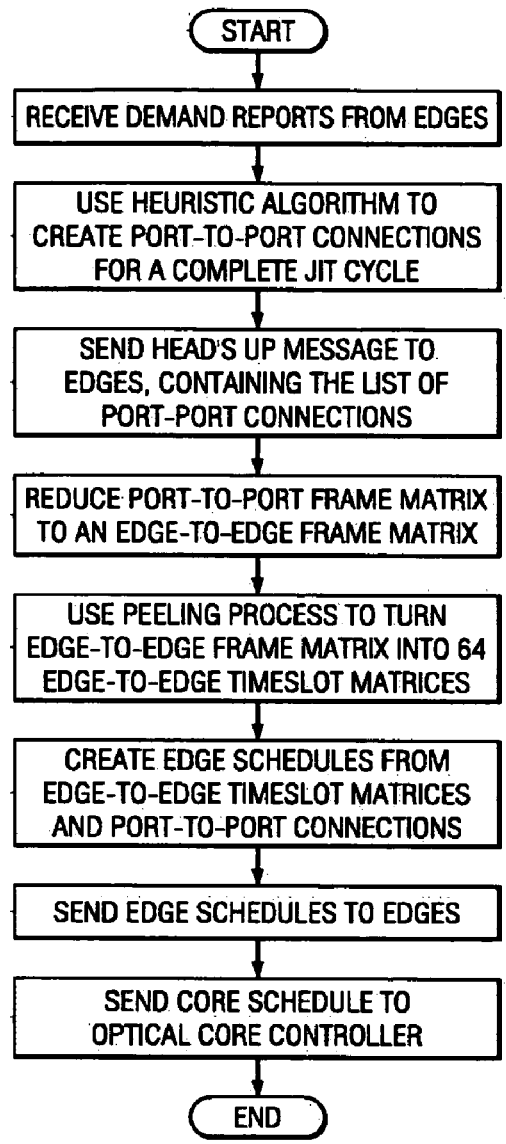
FIG. 14 is a flow diagram illustrating the process which is implemented in computing a new schedule in one embodiment of a switching system using the present architecture.

Schedule Calculation (H). The core scheduler will receive all demand. Then it uses the heuristic algorithm to determine which port-to-port connections will be made over the course of one cycle. The port-to port connections can then be sent to the edges, along with a head's up message announcing the expected number of frames left for the old schedule. The port-to-port matrix is reduced to an edge-to-edge matrix, representing the edge-to-edge connections made over an entire cycle. A so called peeling process is then used to split these connections into individual timeslots. It then combines the port-to-port connections with the edge-to-edge timeslot connections to create a full port-to-port timeslot schedule. Each edge is sent its portion of the overall schedule, and the Core Optical Core Controller is sent the full list of connections. This process is illustrated in FIG. 14.

Algorithm Design Considerations. The system may use various types of algorithms in the selection of a new schedule. For example, statistical, organizational or heuristic algorithms may be employed. It is contemplated that a combination of all three types of algorithms may provide the best performance.

Statistical algorithm. This type of algorithm builds, over time, a catalog of good schedules for typical traffic on a switch. It compares current traffic levels to the traffic levels used to generate the cataloged schedules. When it finds a close match in demand, it uses the associated schedule. There are two problems with this method for the preferred embodiment. First, it requires that the problem be solved in advance a number of times to create a catalog, so it does not solve the problem of how to calculate the initial schedules. Secondly, it assumes a reasonably long run under real traffic conditions before the catalog is particularly useful, and so is no good for runs of a few milliseconds duration in the lab.

Optimization algorithm. The problem of finding a new schedule can be formulated as a Linear Programming problem. Letting $V_{ijk}$ represent the value, in Quality of service units, of sending the k-th container from ingress port i to egress port j. Then the edge and port and blocking restrictions can be represented mathematically as constraints of the model. The sum of the $V_{ijk}$ values for the containers sent over the course of one cycle can be maximized as the objective function. This will guarantee the best possible schedule for the current demand set. Unfortunately, the Linear Programming problem is probably too complex to solve within the time constraints.

Heuristic algorithm. The heuristic "greedy" algorithm uses the same data as the linear programming model, but rather than calculating the global maximum, it automatically accepts the highest priority traffic. It constructs a schedule that includes the highest-valued containers possible, working down through the priority levels until the schedule is complete. Note that this is not the same as choosing the highest-valued overall schedule. That is a much more complex problem, that would take much more time to solve. The result of the heuristic might not be the ideal schedule, but it will be close, and it will include the highest-valued containers possible.

Figure 15:
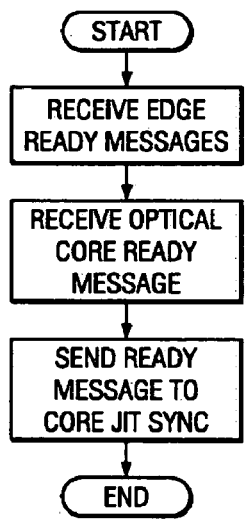
FIG. 15 is a flow diagram illustrating the process which is implemented in coordinating the changing of the currently active schedule to a new schedule in one embodiment of a switching system using the present architecture.

Schedule Change Synchronization. The core schedule will receive ready messages from each edge, and from the optical Core Controller. When all ready messages are received, it will inform the Core sync, which will coordinate the schedule change. This process is illustrated in FIG. 15.

Functions of the Edge Scheduler

The Edge scheduler coordinates the communication between the core scheduler and the port scheduler, and sends the edge schedule to the TWDM controller.

During the steady state, the edge receives port sufficiency reports, compiles them, and sends them to the core scheduler. When the transition state is reached, the edge is made aware of this by receiving a demand request message, which it passes down to its ports. The Port Demand Messages are sent up to the edges, and the Edge Schedule compiles them into smaller messages, which are sent in sequence to the core scheduler. Finally, when the Edge Schedule Message is received, it sends it to the TWDM Controller, and also creates port schedules to send to the edges.

Figure 16:
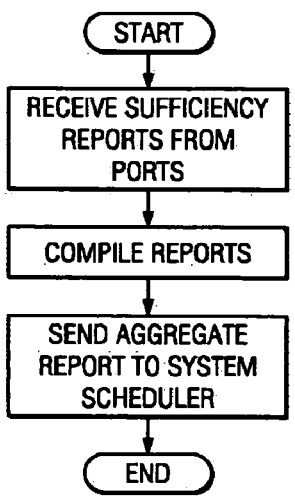
FIG. 16 is a flow diagram illustrating the manner in which sufficiency reports are compiled by an edge unit and transmitted to the core scheduler in one embodiment of a switching system using the present architecture.

Edge sufficiency reports (B). During the steady state, the edge scheduler will receive the port sufficiency reports every cycle, and produce an edge sufficiency report. It then sends this edge sufficiency report to the core. This process requires no processing by the edge except compiling the port data. This is illustrated in FIG. 16.

Figure 17:
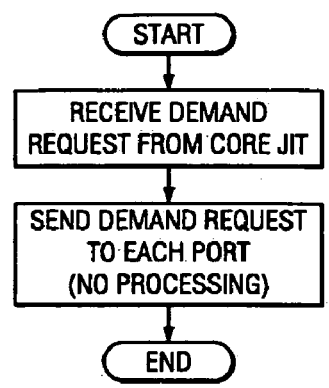
FIG. 17 is a flow diagram illustrating the manner in which demand requests are received by an edge unit and forwarded to the corresponding ports in one embodiment of a switching system using the present architecture.

Edge Demand Request. The edge receives a demand request from the core and passes the request to each of its ports. The core sends this request when it determines that a new schedule is necessary. This is illustrated in FIG. 17.

Figure 18:
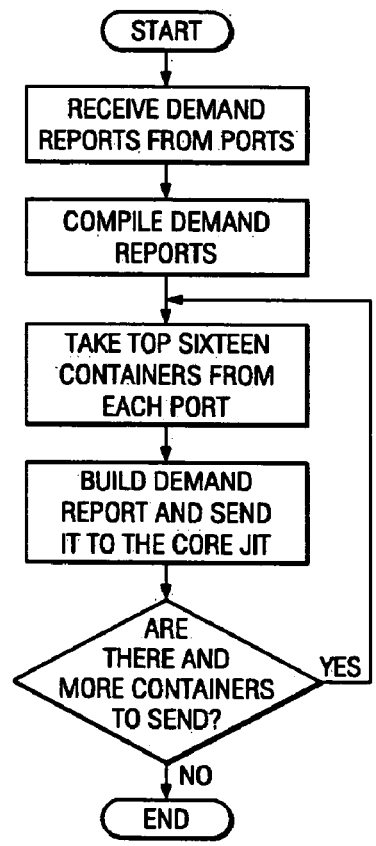
FIG. 18 is a flow diagram illustrating the manner in which demand reports are compiled by an edge unit and transmitted to the core scheduler in one embodiment of a switching system using the present architecture.

Edge Demand Report (G). When the port demand reports have been received by the edge scheduler, the edge scheduler sorts them by $V_{ijk}$, and sends them in groups of 16 from each port up to the core scheduler, as shown in FIG. 18.

Figure 19:
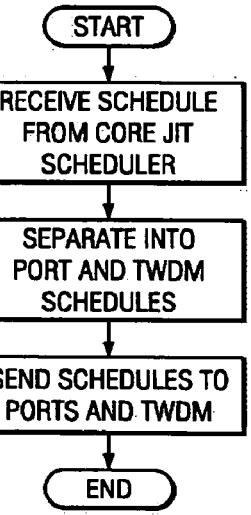
FIG. 19 is a flow diagram illustrating the manner in which schedules are distributed by a core scheduler to an edge unit in one embodiment of a switching system using the present architecture.

Schedule Distribution Report (J). The core scheduler sends an ingress edge schedule and an egress edge schedule to the edge scheduler. The edge scheduler then creates four separate port reports and sends an ingress schedule and an egress schedule to each port scheduler. Then the edge scheduler sends the schedules to the TWDM, as shown in FIG. 19.

Functions of the Port Scheduler

A port receives incoming packets, determines their character, and assigns them into queues based on their egress port and Quality of Service. The highest priority for packetized traffic for the preferred embodiment is MPLS. The second and third priorities are the two categories of DiffServ traffic (DFS-1 and DFS-2), and the lowest level is Best Effort (BE) traffic. TDM is sent into a separate buffer immediately. TDM priority dominates the priority of all other traffic.

The port scheduler allocates flow buffers for established TDM connections, then from among the POS input queues based on the current schedule. It identifies the highest priority traffic and moves this traffic to the staging flow buffer. The port scheduler tracks the value of the containers it sends each frame, as well as the value of the best 16 containers it could have sent. Based on this input from all ports, the core scheduler determines whether a new schedule is needed. When a new schedule is called for, the port scheduler collects data from the QoS queues and uses this data to generate demand reports for the core scheduler. When the new schedule is received, the port scheduler sends it to the traffic manager. The traffic manager then uses the schedule that it receives from the core scheduler to schedule containers.

Figure 20:
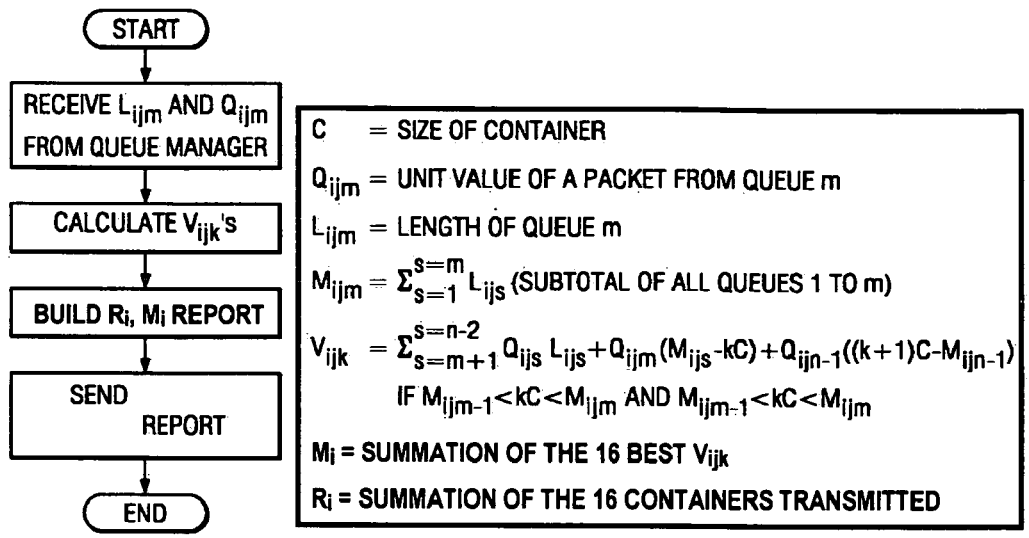
FIG. 20 is a flow diagram illustrating the process by which a port compiles a sufficiency report in one embodiment of a switching system using the present architecture.

Port Sufficiency Reports (A). Each cycle, the port scheduler compiles a list of the top 16 containers' worth of data in its queues. It does this by taking the top 16 $V_{ijk}$ values. Their sum is $M_i$, where i is the ingress port. It also compiles the value of $V_{ijk}$ for each container it sends, which allows it to calculate the 16 containers it actually sends. This quantity is $R_i$. These two quantities are then sent up to the respective edges as shown in FIG. 20.

Figure 21:
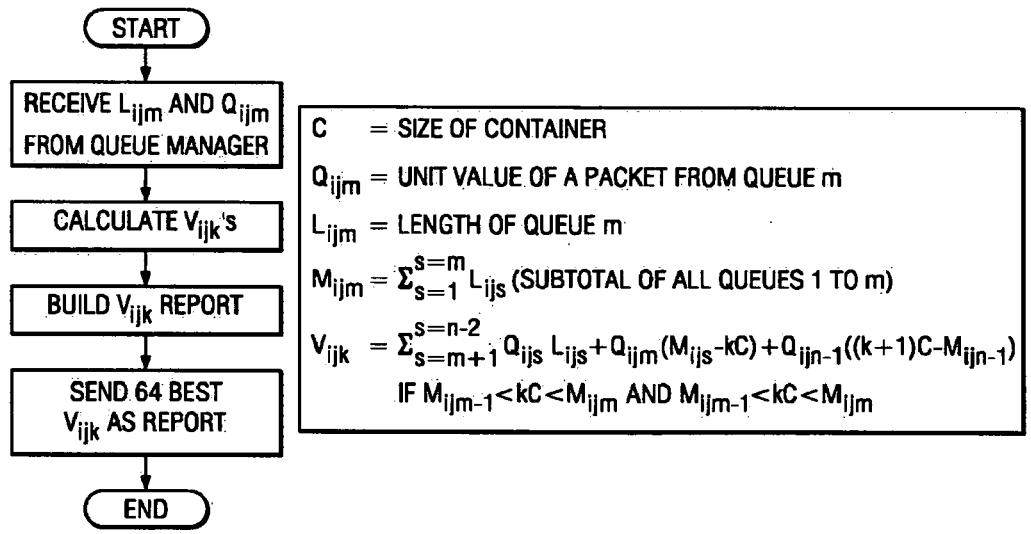
FIG. 21 is a flow diagram illustrating the process by which a port compiles a demand report in one embodiment of a switching system using the present architecture.

Port Demand Message. When the Port receives the Demand Request, it calculates all $V_{ijk}$ values from $L_m$ and $Q_m$, and sends the top 64 values to the edge, as shown in FIG. 21.

Receiving the schedule. The port receives an ingress and egress schedule from the edge scheduler. These schedules must be padded with zeroes in unused timeslots and sent to the FPGA. Depending upon the relative costs of port processing and messaging, the schedules might be sent from the edge in that larger format. For use by silicon processing, the schedule must consider each timeslot in the cycle, even when timeslots that are not allocated to the port.

When the FPGA receives the schedule it puts it in the inactive area. It sends a Ready Message up through the port scheduler and the edge scheduler to the core scheduler when it is ready to switch schedules. Then it receives a ready ack message verifying the schedule change time. The ingress schedule is put into active service when it is time to start allocating containers to the buffer according to the new schedule. Then, when the containers are actually ready to cross the fabric, the egress schedule is made active.

Scheduling Messages

The scheduling messages which are employed in the preferred embodiment to implement the functionality described in the preceding paragraphs are listed below.

Ready Messages. All Ready Messages are simple flags that identify that the source of the message is ready and nothing more. They are all merely 2 bytes plus overhead, and so are not detailed here.

Port Sufficiency Message. This message consists of the message type, the port identifier plus two numbers—4 bytes plus overhead. It is sent from each port every cycle, except while a new schedule is being calculated.

Edge Sufficiency Message. Each edge scheduler sends this message every cycle during the steady state. This message indicates how well the schedule is satisfying the current port demands.

Core Sufficiency Acknowledgement Message. Each sufficiency message is acknowledged via a sufficiency acknowledgement message. If sufficiency reports trigger the need for a new schedule, a flag will tell the edges to collect and send the demand reports. This message is simply a flag—1 byte plus overhead.

Demand Request. When the Core determines that a new schedule is needed, it sends out a request for demand reports. These messages are simply flags, and carry no information except that they have been sent.

Port Demand Message. When a new schedule is needed, the port receives a demand report request. This triggers the creation of a port demand message. The port demand message is a list of priority demands, in the form of a list of potential containers, with egress port and value of the container ($V_{ijk}$). In the preferred embodiment, the demand report lists the values of all containers sitting in queues. Since only four edge reports will be sent, a maximum of 64 containers must be sent up from the port. This message can be of variable size, up to 130 bytes, plus overhead.

Edge Demand Message. When the edge receives the port messages described above, it builds a message that has the top 16 container reports from every port and ships it to the core scheduler to begin creating a schedule. It immediately creates a second message with the next 16 most important containers from each port. In the preferred embodiment, the demand report message is 50 bytes plus overhead. It sends a total of 4 of these messages. If needed, the edge scheduler fills portions of the table with blanks.

Core Heads Up Message. When the heuristic algorithm is finished, the port-to-port connections are known, so they can be sent down to the ports during the peeling process. These are unordered connections, and the message serves two purposes—to let the port know which flows will soon be cut off, and to give an estimate on the last cycle that will use the old schedule. Based on this information, the port can cut off flows gracefully. It should be noted that this is an estimate—the actual cut off time will be determined after every port has acknowledged receiving the new schedule. The Core Heads Up Message is 388 bytes plus overhead. This can be reduced somewhat if ingress and egress ports can be identified within a single byte. Also, this is an unordered list, so more space can be saved, or edge processing time reduced, if it is sorted by ingress port.

Edge Heads Up Message. The edge must pass each port its own portion of the heads up message, to let the port know which flows will soon be cut off, and to give an estimate on the last cycle that will use the old schedule. With this information, the port will cut off flows gracefully. Again, this is an estimate—the actual cut off time will be determined after every port has acknowledged receiving the new schedule. The Edge Head's Up Message is 68 bytes plus overhead.

edge scheduler message/TWMD Scheduler Message. This message is sent by the core scheduler to give the new schedule to each edge. It is also sent directly from the edge scheduler to the TWDM Controller. In the preferred embodiment, the Edge Schedule message is 386 bytes plus overhead. This can be reduced somewhat if ingress and egress ports are identified within a single byte. The ingress schedule must be capable of identifying the destination port (Egress Port) from among all switching system ports (i.e. 16 in the preferred embodiment—not just the port relative to the local edge). Consequently, this field requires more space. Likewise, for the Egress schedule, the source port (Ingress port) must be identifiable from among all egress ports (16 in the preferred embodiment), again requiring more parameter storage space. Two bytes allow selection among 65536, so there is room for growth here as well. There are 64 timeslots in the schedule cycle (frame) for LP-1.5. The message has a triplet for each ingress timeslot and for each egress timeslot.

port scheduler Messages. When the edge receives the message giving it the new schedule, it creates Port Demand Messages for each port. The port schedule message is 98 bytes, plus overhead. If we wish to send it in the form that it will be used by the FPGA, then we will need to send all 64 timeslots, with zeroes for the timeslots that are not used by that port. However, the timeslot field would then be implicit. The complete schedule would be 258 bytes plus overhead.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. For example, the components described above may be implemented in hardware, firmware or software, and the functions of the system may be redistributed among the components as desired in a given embodiment. It is contemplated that these variations, modifications, additions and improvements fall within the scope of the invention as detailed within the following claims.

The invention claimed is:

1. A system comprising:
   a switching core;
   a plurality of edge units coupled to the switching core, wherein each edge unit contains a set of ingress ports and a corresponding set of egress ports, and wherein each edge unit further contains an edge unit scheduler; and
   a switching core scheduler coupled to the switching core,
      wherein the switching core scheduler contains a first memory configured to store a first switching schedule and a second memory configured to store a second switching schedule,
      wherein the switching core scheduler is configured to designate one of the switching schedules as an active schedule and the other of the switching schedules as an inactive schedule,
      wherein the switching core scheduler is configured to receive sufficiency reports from the edge unit schedulers, to determine whether the active schedule is sufficient, and
         if the active schedule is sufficient, to maintain the active schedule, and
         if the active schedule is not sufficient, to activate the inactive schedule.

2. The system of claim 1 wherein if the active schedule is not sufficient, the switching core scheduler is configured to request demand information from the edge units and to recompute the inactive schedule based on the demand information prior to activating the inactive schedule.

3. The system of claim 1 wherein the switching core scheduler is configured to transmit a notification to each edge unit prior to activating the inactive schedule, and wherein the switching core and the edge units are configured to simultaneously begin operating according to the newly activated schedule.

4. The system of claim 3 wherein the switching core scheduler is configured to activate the inactive schedule between frames of data, and wherein the core and edge units are configured to initiate transmissions of data according to the previously inactive schedule at the beginning of a subsequent frame.

5. A system comprising:
a switching core;
a plurality of edge units coupled to the switching core; and
a scheduler configured to store a first schedule defining a set of connections through the switching core, wherein the first schedule is initially active, and wherein the scheduler is configured to store a second schedule defining an alternative set of connections through the switching core, wherein the second schedule is initially inactive;
wherein the switching core is configured to route data therethrough according to the active schedule; and
wherein the scheduler is further configured to make the second schedule active and the first schedule inactive in response to said scheduler determining that the first schedule is insufficient in transferring data through the switching core.

6. The system of claim 5 wherein the edge units are configured to transmit a signal to the scheduler indicative of the sufficiency of the first schedule.

7. The system of claim 6 wherein the edge units are configured to periodically transmit sufficiency reports to the scheduler.

8. The system of claim 7 wherein the scheduler is configured to collect sufficiency reports from the edge units and to evaluate the sufficiency of the first schedule based on the collected data.

9. The system of claim 5 wherein if the scheduler determines that the first schedule is insufficient, the scheduler is configured to request bandwidth demand data from the edge units.

10. The system of claim 9 wherein the scheduler is configured to compute the second schedule based on demand for bandwidth at the edge units.

11. The system of claim 5 wherein the scheduler contains two storage locations, each of which is configured to store one of the schedules.

12. The system of claim 5 wherein the scheduler is configured to cause the switching core and the edge units to begin operating under the newly activated schedule simultaneously.

13. The system of claim 12 wherein the scheduler is configured to transmit messages to the edge units indicating that a new schedule will be activated, and wherein the scheduler is configured to activate the new schedule only after receiving acknowledgment of receipt of the messages.

14. The system of claim 5 wherein each edge unit includes both ingress and egress ports.

15. The system of claim 5 wherein each edge unit contains an edge scheduling subsystem coupled to the scheduler.

16. The system of claim 15 wherein the edge scheduling subsystem in each edge unit contains two storage locations, each of which is configured to store one of the schedules.

17. The system of claim 16 wherein each edge unit includes both ingress and egress ports, and wherein each port includes a port scheduling subsystem coupled to one of the edge scheduling subsystems.

18. The system of claim 17 wherein each port scheduling subsystem contains two storage locations, each of which is configured to store one of the schedules.

19. A system comprising:
a switching core; and
a plurality of ports coupled to the switching core, wherein the ports include one or more ingress ports and one or more egress ports;
wherein the switching core contains both an active schedule and a new schedule, and is configured to transmit data from the plurality of ingress ports to the plurality of egress ports according to the active schedule, and wherein the switching core is configured to begin to transmit data from the plurality of ingress ports to the plurality of egress ports according to the new schedule in response to determining that the active schedule is insufficient in transferring data through the switching core.

20. The system of claim 19 wherein the switching core further comprises a core scheduler, wherein the core scheduler contains a first memory configured to store the active schedule and a second memory configured to store the new schedule.

21. The system of claim 20 wherein the core scheduler is configured to compute the new schedule based on the demand for bandwidth to transmit data from the ingress ports.

22. The system of claim 21 wherein the new schedule defines a set of non-blocking paths through the switching core.

23. The system of claim 19 wherein the inadequacy of the active schedule is determined based on the efficiency of data transfers through the switching core according to the active schedule.

24. The system of claim 23 wherein the efficiency of the data transfers is determined by edge units which contain the ingress ports.

25. The system of claim 19 further comprising a plurality of edge units, wherein each edge unit contains at least one of the ports.

26. The system of claim 25 wherein each of the plurality of edge units contains one of the ingress ports and one of the egress ports.

27. The system of claim 25 wherein each of the edge units contains an edge unit scheduler.

28. A scheduler for use in a data switching system comprising:
a plurality of edge schedulers; and
a core scheduler coupled to the plurality of edge schedulers, wherein the core scheduler is:
configured to operate according to an active schedule residing in the core scheduler, the active schedule defining connections in the switching system,
coupled to receive information indicating the sufficiency of data transfers through the switching system,
configured to determine the sufficiency of data transfers through the switching system,
configured to compute a new schedule defining a set of non-blocking connections through the switching system, and
configured to begin operating according to the new schedule if data transfers through the switching system are determined to be insufficient.

29. The scheduler of claim 28 wherein the core scheduler comprises a first memory configured to store a first schedule and a second memory configured to store a second schedule, wherein the core scheduler is configured to store the active schedule in one of the memories and the new schedule in the other of the memories.

30. The scheduler of claim 28 wherein the edge schedulers are configured to provide sufficiency information to the core scheduler.

31. The scheduler of claim 30 wherein the edge schedulers are configured to provide demand information to the core scheduler, and wherein the core scheduler is configured to compute the new schedule based on the received demand information.

32. The scheduler of claim 30 wherein each edge scheduler comprises two memories and wherein each edge scheduler is configured to store the active schedule in one of the memories and the new schedule in the other of the memories.

33. The scheduler of claim 30 wherein the edge scheduler is configured to begin operating according to the new schedule simultaneously with the core scheduler.

34. The scheduler of claim 30 further comprising a plurality of port schedulers coupled to the edge schedulers, wherein the port schedulers are configured to begin operating according to the new schedule simultaneously with the edge scheduler.

35. A scheduling system for use in a switching system comprising:
- a core scheduler; and
- a plurality of edge schedulers coupled to the core scheduler;
- wherein in a steady state, the core scheduler is configured to
  - maintain an active schedule that defines data paths in the switching system,
  - receive information from the edge schedulers indicating the sufficiency of data transfers corresponding to the edges,
  - determine the sufficiency of data transfers through the switching system,
  - if data transfers through the switching system are determined to be insufficient, transition to a second state;
- wherein in the second state, the core scheduler is configured to
  - receive information indicating demand for the edge schedulers,
  - compute a new schedule that defines new connections in the switching system,
  - activate the new schedule, and
  - transition to the steady state; and
- wherein the edge schedulers are configured to operate in conjunction with the core scheduler to route data through the switching system according to the data paths defined by the currently active schedule.

36. The Scheduling system of claim 35 wherein activating the new schedule comprises transmitting the schedule to the edge schedulers and beginning operation according to the new schedule.

37. The Scheduling system of claim 36 wherein the core scheduler and edge schedulers are configured to begin operating according to the new schedule simultaneously.

* * * * *